US005555770A

United States Patent [19]
Dolata et al.

[11] Patent Number: 5,555,770
[45] Date of Patent: Sep. 17, 1996

[54] BALL SCREW AND NUT SYSTEM

[75] Inventors: Randy W. Dolata, Linden; Lisa A. Houlihan, Saginaw, both of Mich.

[73] Assignee: Thomson Saginaw Ball Screw Company, Inc., Saginaw, Mich.

[21] Appl. No.: 321,966

[22] Filed: Oct. 12, 1994

[51] Int. Cl.$^6$ ............................................. F16H 25/22
[52] U.S. Cl. .................. 74/459; 74/424.8 R; 403/340
[58] Field of Search .................. 74/459, 424.8 R; 403/326, 339, 340

[56] References Cited

U.S. PATENT DOCUMENTS

| | | | |
|---|---|---|---|
| 3,580,098 | 5/1971 | Goad | 74/459 |
| 4,074,585 | 2/1978 | Richaud et al. | 74/424.8 R |
| 4,604,911 | 8/1986 | Teramachi | 74/459 X |
| 4,677,869 | 7/1987 | Mayfield | 74/424.8 R |
| 5,005,436 | 4/1991 | Brusasco | 74/459 |
| 5,193,409 | 3/1993 | Babinski | 74/459 X |

FOREIGN PATENT DOCUMENTS

| | | | |
|---|---|---|---|
| 1081146 | 3/1953 | France | 74/459 |
| 2353734 | 10/1973 | Germany | 74/459 |
| 6201013A | 7/1994 | Japan | 74/459 |

*Primary Examiner*—Charles A. Marmor
*Assistant Examiner*—Troy Grabow
*Attorney, Agent, or Firm*—Learman & McCulloch

[57] ABSTRACT

A ball nut and screw system has a ball screw mounting a coaxial ball nut. A ball train is disposed in the helical trackway defined by the helical grooves of the nut and screw. A ball end return assembly is provided for the nut which has separate end walls carrying generally radially extending return tracks which communicate with the trackway and the nut has an external ball return surface in communication with the tracks. Interengaging parts on the end walls partially envelop the nut and interconnect the end walls.

28 Claims, 4 Drawing Sheets

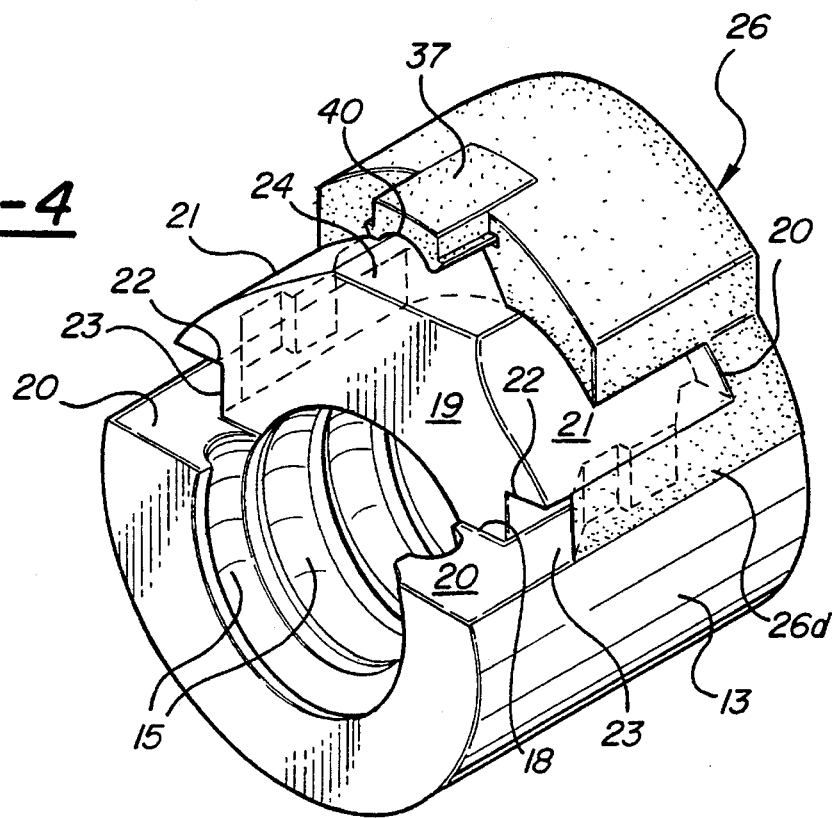
FIG-4
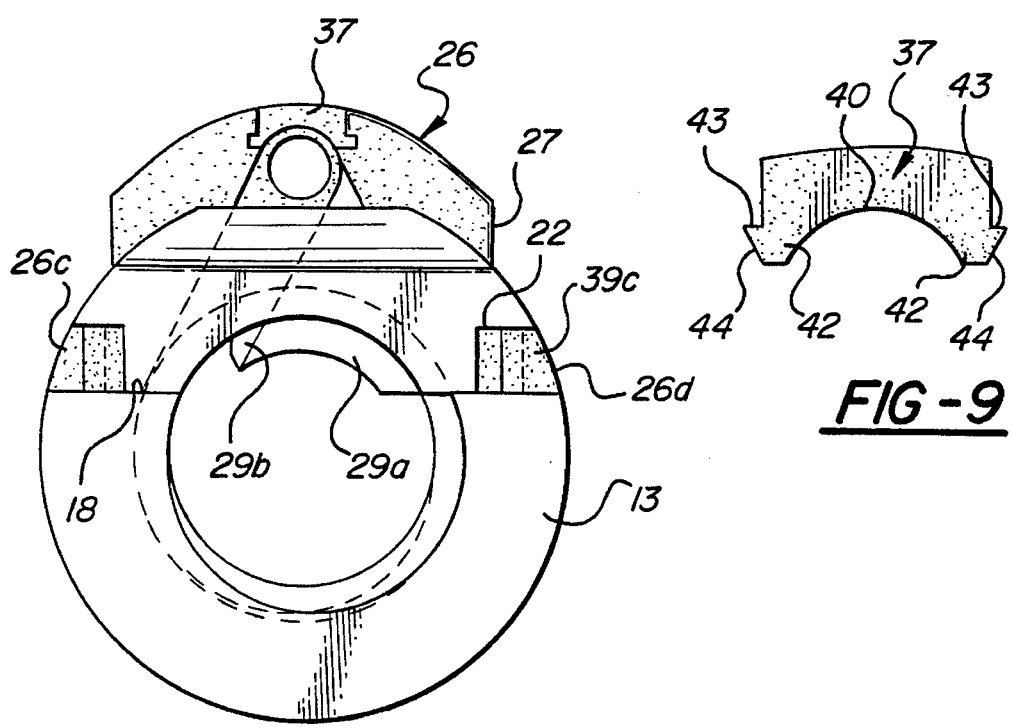
FIG-5
FIG-9

BALL SCREW AND NUT SYSTEM

BACKGROUND OF THE INVENTION

This invention relates to ball screw and nut assemblies, and more particularly to the manner of routing the train of balls which exit one end of the nut and move around to the other end of the nut in a continuous circuit.

Ball return systems for ball nuts have, in the past, often utilized radially extending openings at each end of the nut which communicate with the internal ball raceway to connect an external ball return tube which provides the return path. To avoid this external structure where it is not feasible to use it, other prior art ball nuts have utilized longitudinal return passages extending internally in an axially parallel direction through the nut body into which the balls are fed at one end and returned at the other to the helical ball path. Typically, end closures or caps for such nuts have been provided to turn the ball circuit reversely, with the end closure caps being grooved to provide channels forming part of the ball return circuit.

In some such prior art systems, the end closures have been molded from a plastic material and fasteners have been employed to secure them to the end walls of the nut. Plastic end closures are disclosed in prior U.S. Pat. Nos. 4,074,585 and 4,677,869. In these systems, the nut and screw were machined of the typical steel material used by ball nut and screw manufacturers to enable the mechanisms to bear heavy loads with maximum wear resistance. Because the trackway for the train of balls is formed in steel bodies, high mechanical efficiencies can be obtained with low torque inputs and ball nut and screw assemblies of this type are particularly suited for use where precision must be maintained.

SUMMARY OF THE INVENTION

A ball nut and screw assembly has been devised in which the load bearing train of balls is returned by way of a ball return guide cap which traps the balls between an exterior surface of the nut and the cap, and permits top loading of the balls into the assembly in the first place. An end closure system for the nut is made up of interengaging end closures or walls which snap together without the need for fasteners and a ball guide cap is configured to snap-fit into an opening in the end closure system and also secure without the need for fasteners.

One of the prime objects of the invention is to provide a ball nut and screw system which utilizes one external face of the nut as a load bearing ball return surface and avoids the use of the conventional external ball return tube and the fasteners required to attach the tube to the ball nut.

A further object of the invention is to provide a system of the character described which permits top loading of the balls to this nut ball return surface and provides a ball guide cap which can simply be snapped into assembled position over the nut ball return face.

Still another object of the invention is to provide molded plastic nut end closures which flexibly interfit to snap together and securely lock around a steel nut in a manner which greatly simplifies assembly of the product.

A further object of the invention still is to devise a fastenerless assembly which includes molded plastic nut end closure components and uses them to retain a molded plastic snap-in cap which guides the travel of the train of balls in the return direction across an external ball return surface provided on the nut.

A further object of the invention is to minimize the number and complexity of machining operations which are required and to minimize the number of components which need to be assembled.

Still another object of the invention is to provide an economically manufactured ball nut and screw system in which the stamping, machining, heat treating and plating operations formerly required are minimized or eliminated.

Another object of the invention is to maximize load capacity in ball nut and screw systems for a given package or product size.

Still a further object of the invention is to provide an end closure assembly for such systems which is relatively jam proof, and which has components which can be readily and inexpensively mass molded from suitable plastic material.

Other objects and advantages of the invention will become apparent with reference to the accompanying drawings and the accompanying descriptive matter.

BRIEF DESCRIPTION OF THE DRAWINGS

In the drawings.

FIG. 4 is a perspective elevational view of the system with one of the nut end closures removed;

FIG. 5 is an end elevational view thereof;

FIG. 9 is an enlarged scale, end elevational view of the ball guide cap.

GENERAL DESCRIPTION

Figure 1:
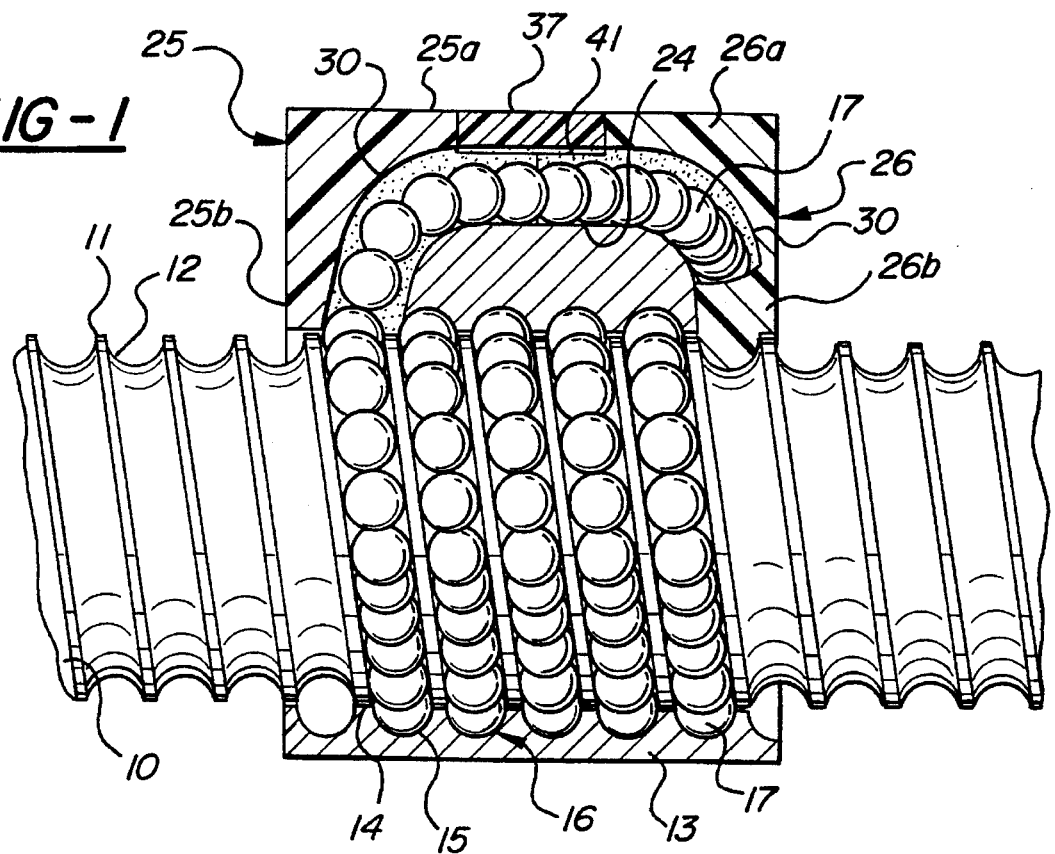
FIG. 1 is a schematic sectional elevational view of our ball nut and screw system.

Referring now more particularly to the accompanying drawings, the externally threaded, usually steel, shaft 10 is shown as having helical land portions 11 and helical groove portions 12. The usually steel nut 13 is shown as having helical land portions 14 and helical groove portions 15, which are helically complementary, or matched with the screw, such that an internal ball trackway, generally designated 16, is provided between the groove portions 12 and 15 to accommodate a train of abutting load bearing, usually steel, balls 17.

As FIG. 4 perhaps best indicates, the upper half of the nut 13 is cut away at both ends as at 18 to leave radially extending flat inset vertical end faces 19 and horizontal seat surfaces 20. The curvilinear surface 21 at the sides of the nut 13 are also cut away, grooved, or notched as at 22 on both sides of the nut to provide axially parallel horizontal surface continuations 23 which connect the surfaces 20 on each side of the nut, along with shoulder walls 23a and 23b. In addition, the upper curvilinear surface 21 of the nut is machined to provide a flat ball return surface 24 which extends horizontally axially from one nut end surface 19 to the other nut end surface 19.

Provided to seat on the surfaces 20 at each end of the nut 13, to only partially envelop screws 10 are hermaphroditic, molded plastic, end ball return guide closures or end closures or cap or wall members, generally indicated 25 and 26, respectively. The members 25 and 26 may be preferably molded from a self-lubricating plastic material, such as a polyamide or a polytetrafluoroethylene, or another suitable resin material which provides the necessary rigidity while also, as will become clear, providing some flexibility and resiliency in portions of thinner cross section.

As FIGS. 3 and 6–8 particularly indicate, the member 25 is formed with an upper hood portion 25a, with flatted sides 27, and a vertically extending base portion 25b which provides a flat undersurface 28 to seat on the wall surfaces 20 of the nut at one end thereof. Provided to project inwardly from the base 25b are locking legs or prongs 25c and 25d. As FIGS. 6–8 particularly indicate, an internally projecting helical protrusion 29a is provided within the curvilinear opening 29 provided in base 25b to pass the screw 10, the helical projection 29a being configured to extend into the helical groove portions 12 formed in screw 10. A radially extending ball groove or passageway 30 is formed in the portions 25a and 25b of the end closure 25 as a ball return passage which extends to nut surface 24 in an inclined radial direction from the internal trackway 16. The end surface 29a of projection 29 can act as a pick up surface to guide the balls 17 in a path from the trackway 16 up into the ball return passage 30.

The inner face 31 of end closure member 25, when member 25 is in assembled position on the nut 13, is in engagement with the wall surface 19 and the immediately inner portion of the channel or passage 30, at 30a, (FIG. 8) is open to and closed by the internal wall surface 19 so that the balls 17 bear on this surface 19 when they initially move radially outwardly. The hood portion 25a projects axially inwardly from the base 25b and partially envelops the nut curvilinear side surfaces 21. To accomplish this, the projecting portions of the hood 25a include curvilinear surfaces 32 which engage the surfaces 21, and flatted end edge surfaces 33 which engage the nut surface 24. It is to be observed in FIG. 8 that the center line of the ball return path is tangent to the ball circle diameter x at point y.

Provided in hood portion 25a, is an inversely T-shaped slot, generally designated 36, which is to receive one end of a ball guide cap 37 in a manner which will be more specifically discussed presently. It will be noted that the prongs or legs 25c and 25d are of related configuration. Prong 25c is formed with an exteriorly facing interior recess 38, with a radial lock face 38a and inset flat surface 38b, and a projection 38c with an inclined piloting surface 38d. Prong or leg 25d has an interior recess 39, with locking surface 39a, inset surface 39b, and a projection 39c with a piloting surface 39d.

It will be observed that the members 25 and 26 are identical. Whereas the hood portion of end closure 26 is identified by the numeral 26a, the base portion by the numeral 26b, and the prongs by the numerals 26c and 26d, the same numerals used to identify the specific configurations of the end closure 25 have been used to identify the same features of end closure 26 and the description thereof will not be repeated. Thus, end closure member 26 has the same inversely T-shaped slot 36 and is able to cooperate with the end closure member 25 in holding the guide cap 37 in position in the assembled system.

Figure 3:
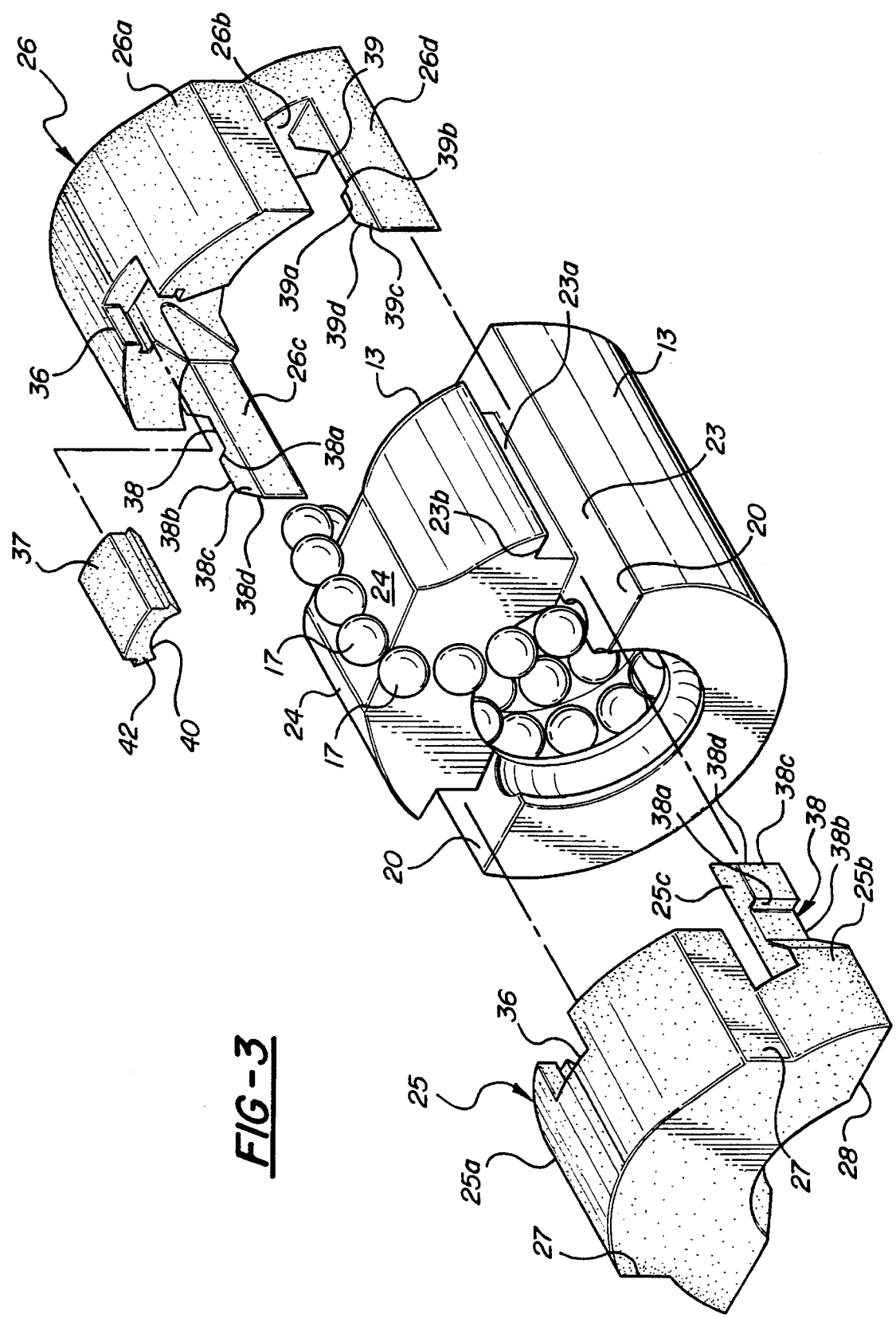
FIG. 3 is an exploded, perspective, elevational view more particularly illustrating component parts of the system.
Figure 6:
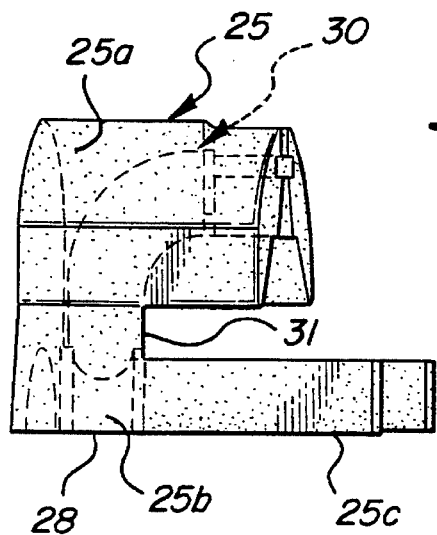
FIG. 6 is a reduced scale, slightly perspective, side elevational view of one of the plastic nut end closures.
Figure 7:
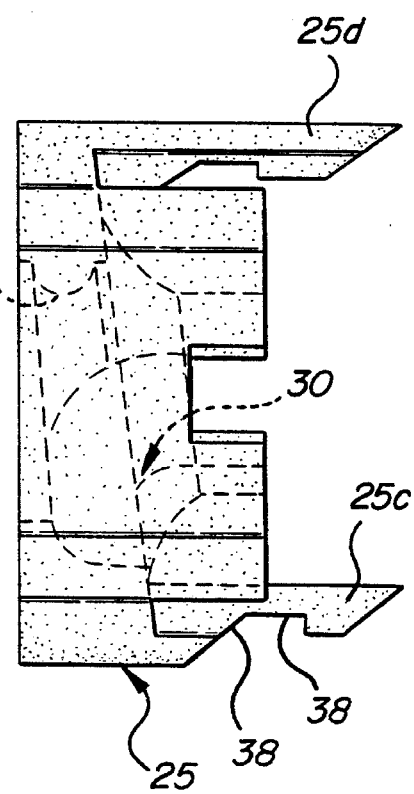
FIG. 7 is a top plan view thereof.
Figure 8:
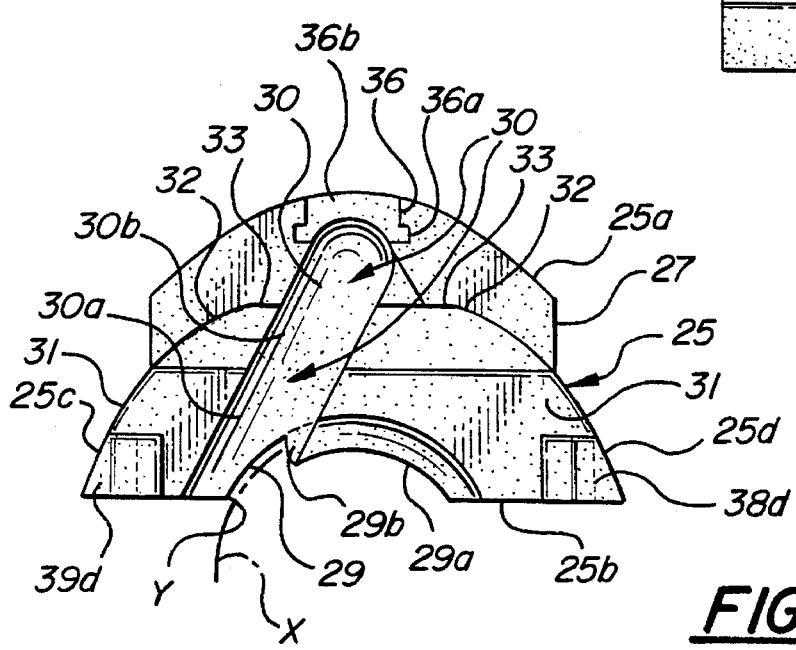
FIG. 8 is an interior end elevational view thereof.

As FIGS. 3 and 9 particularly indicate, the ball guide cap, generally designated 37, has a curvilinear interior face 40 which cooperates with the surface 24 to guide the balls 17 in their path axially across surface 24, the two surfaces 40 and 24 defining what may be termed a ball return pathway 41 (FIG. 1). With the cap cut away as at 40 (FIG. 9), flexible, reduced section legs 42 are formed which are provided with lock shoulders 43. The resilient leg portions 42 are received in the enlarged inner portions 36a of slots 36 in abutting relation with slot end walls 36b. It is to be understood that the cap 37 is flexible to the point that legs 42 can be relatively compressed by the piloting surfaces 44, which will permit the cap 37 to be inserted from above, the piloting surfaces 44, when cap 37 is pushed downwardly, resiliently compressing the legs 42 relatively until the shoulders 43 are captured within the portions 36a of the slot 36.

Figure 2:
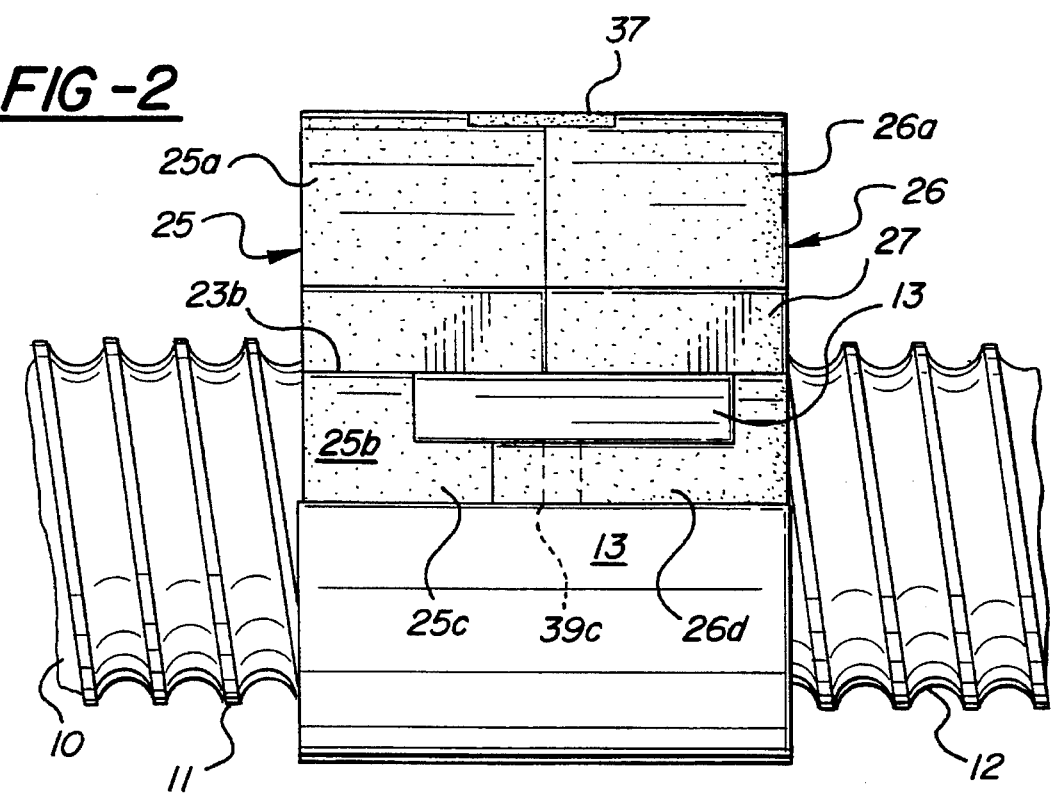
FIG. 2 is a side elevational view thereof.

As FIGS. 2 and 3 perhaps best indicate, the projections 39c seat in the recesses 38 and the projections 38c seat in the recesses 39 when the caps 25 and 26 are in lapping interengaged assembled relation. The respective piloting surfaces 38d and 39d cooperate to spread the legs 26d during the assembly process. When assembled, the legs' 25c and 26c flat interior surfaces are in mating interlocking engagement with the grooved surfaces 23a and 23b of the nut.

THE PROCESS OF ASSEMBLY AND OPERATION

With the nut 13 formed in the manner indicated, end closures 25 and 26 are placed in the relation indicated in FIG. 3 and moved together to embrace the nut 13, with legs 25c and 26d interacting or interlocking and legs 25d and 26c similarly interlocking. The shoulder surfaces 23a and 23b provided on the nut function to lock the end closure members 25 and 26 to the nut. With the slots 36 open, the balls 17 are loaded and pushed into abutting position until they fill the system, as shown in FIG. 3. Thereafter, it is only necessary to insert cap 37 into the overall slot formed by the slots 36 and press it downwardly. This laterally compresses legs 42 until they are able to enter the slot portions 36a and lock in.

Clearly, the balls 17 are able to travel in either direction in the ball paths formed. Bearing loads are borne by the steel nut 13 and screw 10 in the usual manner with the molded plastic members 25, 26, and 37 functioning, for practical purposes, as guides.

It is to be understood that the embodiments described are exemplary of various forms of the invention only and that the invention is defined in the appended claims which contemplate various modifications within the spirit and scope of the invention.

We claim:

1. In a ball nut and screw assembly:

a) an axially extending metallic screw having exterior helical groove portions, and a coaxial metallic nut on said screw having opposite transversely extending axially outwardly facing end walls and interior helically complemental groove portions extending to said nut end walls, the respective groove portions of the screw and nut defining a helical raceway;

b) a train of load transfer bearing balls accommodated in said raceway; and c) a ball return assembly including axially inward facing plastic end wall portions adjacent said nut end walls and having generally radially extending ball carrying tracks therein in communication with said raceway;

d) said ball return assembly including a ball return guide positioned externally of said nut and retained by at least one of said end wall portions, said guide having a ball-receiving surface parallel to the axis of the screw, the ball-receiving surface opening to said tracks to form conjunctively with said tracks a ball return trackway to said raceway which does not extend through said nut.

2. The ball nut and screw assembly of claim 1 wherein one of said return assembly end wall portions includes an axially extending, nut-overlying flange wall and said one return assembly wall portion is in circumferentially engaging locked position with the other return assembly end wall portion to at least partially circumferentially externally envelop said nut.

3. The assembly of claim 2 wherein said return assembly end wall portions have mating snap-together parts which retain them in position.

4. The ball nut and screw assembly of claim 3 in which said snap-together parts comprise axially extending legs on one return assembly end wall portion and leg-receiving walls with axially extending channels on the other return assembly end wall portion in which said legs are received.

5. The ball nut and screw assembly of claim 4 wherein said legs and leg-receiving walls have intermeshable radial projections and recesses, and piloting surfaces spreading said legs to assist a snap-together interlock.

6. The ball nut and screw assembly of claim 5 wherein said nut has axially parallel grooves in its external surface and said legs extend in said grooves to interlock to said nut.

7. The ball nut and screw assembly of claim 5 wherein the legs on said one return assembly end wall portion are flexible and resilient legs projecting from its sides, and the leg on one side of said one return assembly end wall portion has an internally projecting projection while the leg on the other side has an externally facing recess.

8. The ball nut and screw assembly of claim 1 wherein an axially extending ball receiving surface is provided as an external surface of said nut and at least one of said return assembly end wall portions has a snap-in opening, and said ball return guide is a cap which provides a cover for said nut ball receiving surface to permit top loading of said balls thereto.

9. The ball nut and screw assembly of claim 8 wherein said return assembly end wall portions have aligned snap-in recesses for mutually receiving said cap.

10. The ball nut and screw assembly of claim 8 wherein said cap has downwardly extending compressible resilient legs which are received by said snap-in opening, the opening being formed with a locking shoulder and the cap legs being formed with retaining surfaces for engaging under said shoulder to hold the cap in place.

11. The ball nut and screw assembly of claim 1 wherein said return assembly end wall portions have helical protrusions received in said raceway to provide secondary redundancy and deflect said balls to said tracks.

12. In a ball nut and screw assembly:
a) an axially extending ball screw having exterior helical groove portions;
b) a coaxial ball nut on said screw having ends axially outwardly facing end walls and interior helical groove portions extending thereto to define a helical trackway with said screw groove portions;
c) a ball end return assembly for said nut, the return assembly having separate return assembly end walls adjacent the opposite end wall of the nut carrying generally axially outwardly radially return tracks communicating with said trackway;
d) said nut having a ball return surface in communication with said tracks; and
e) interengaging snap fitting resilient parts on said return assembly end walls interconnecting said return assembly end walls.

13. The ball nut and screw assembly of claim 12 wherein said interengaging parts comprise axially extending resilient legs on one return assembly end wall and axially extending snap-fit surfaces in which said legs are received on the other return assembly end wall.

14. The ball nut and screw assembly of claim 13 wherein said nut has groove portions for receiving said legs in interlocked assembly.

15. The ball nut and screw assembly of claim 13 wherein said other return assembly end wall also has axially extending resilient legs formed to provide said snap-fit surfaces when said legs on both return assembly end walls are brought into radially overlapping relation.

16. The ball nut and screw assembly of claim 15 wherein one of said legs on each return assembly end wall has an exteriorly facing groove and projection and the other of said legs on each return assembly end wall has an interiorly facing groove and projection, spaced axially to mesh with the grooves and projections in the legs of said other return assembly end wall.

17. The ball nut and screw assembly of claim 16 wherein radially inclined piloting surfaces are provided on said legs which mutually spread said resilient legs with an inwardly facing projection and recess when the legs on both return assembly end walls are moved relatively axially into engagement.

18. The ball nut and screw assembly of claim 12 wherein said ball return surface on said nut is provided exteriorly on said nut, and a guide cap, with an interior surface shaped to retain said ball train, is mounted by said return assembly end walls.

19. The ball nut and screw assembly of claim 18 wherein each of said return assembly end walls is provided with an axially extending groove to receive said cap in interfitting relation between them, and said cap has resilient projections with inclined piloting surfaces thereon which are snap-fitted into said axially extending grooves in said return assembly end walls.

20. The ball nut and screw assembly of claim 12 wherein said nut is axially cut away over a portion of its circumferential extent at both ends to provide axially inset seats for said return assembly end walls along with radial wall surfaces for partially radially closing said tracks.

21. In a method of assembling a ball nut and screw assembly comprising: an axially extending screw having exterior helical groove portions, a coaxial nut having opposite transversely extending end surfaces and interior helically complemental groove portions extending thereto, the respective groove portions of the screw and nut defining a helical raceway, a train of load transfer bearing balls accommodated in the raceway, a ball return assembly including separate end wall portions abutting the nut end surfaces having generally radially extending ball carrying tracks therein in communication with the raceway, said ball return assembly including a ball-receiving surface parallel to the axis of the screw, the ball receiving surface opening to said tracks to form conjunctively with the tracks a ball return trackway to the raceway, the end wall portions having axially extending interengaging snap-fit parts, comprising the steps of:

a) moving said return assembly end wall portions in opposing axial directions from positions axially adjacent opposite ends of the nut into an interengaging position with said nut end surfaces in which the end wall portions snap-fit together on said nut to axially embrace said nut and secure said return assembly end wall portions to said nut; and b) loading the train of balls to said ball receiving surface and transferring them in substantially abutting disposition to said raceway and ball return trackway.

22. In a ball nut and screw assembly:
a) an axially extending screw having exterior helical groove portions, and a coaxial metallic nut on said screw having interior helically complemental groove portions, the respective groove portions of the screw and nut defining a helical raceway;
b) a train of load transfer bearing balls accommodated in said raceway; and
c) a ball return assembly including axially inwardly facing end wall portions abutting said nut having generally radially extending ball carrying tracks therein in communication with said raceway;
d) said ball return assembly including an axially extending nut ball return surface formed on the exterior of said nut to communicate with one of said tracks and an axially extending ball return guide positioned externally of said nut to overlie said nut ball return surface and retained by at least one of said return assembly end wall portions, said guide having a ball-receiving surface parallel to the axis of the screw, the ball-receiving surface opening to one of said tracks and overlying said nut ball return surface to form conjunctively with said tracks and nut ball return surface a ball return trackway to said raceway which does not extend interiorly through said nut.

23. The ball nut and screw assembly of claim 22 wherein end wall portions have mating snap-together parts which retain them in position.

24. The ball nut and screw assembly of claim 23 in which said snap-together parts comprise axially extending legs on one return assembly end wall portion and leg-receiving walls with axially extending channels on the other end wall portion in which said legs are received.

25. The ball nut and screw assembly of claim 22 wherein said ball return guide includes an opening above said nut ball return surface and a cap which provides a cover for said nut ball return surface interfits in said opening after permitting top loading of said balls thereto.

26. In a ball nut and screw assembly:
a) an axially extending ball screw having exterior helical groove portions;
b) a coaxial ball nut, with ends, on said screw and having interior helical groove portions defining a helical trackway with said screw groove portions;
c) a ball end return assembly for said nut having separate axially inwardly facing end walls partially covering the respective ends of said nut and carrying generally radially extending return tracks communicating with said trackway;
d) said nut having an axially extending ball return surface formed on its exterior in communication with said tracks, one of said return assembly end walls having an axially extending ball guide overlying said nut ball return surface to provide a cover for said nut ball return surface; and
e) interengaging parts on said return assembly end walls interconnecting said return assembly end walls to secure them to said nut.

27. The ball nut and screw assembly of claim 26 wherein said interengaging parts comprise axially extending resilient legs on one return assembly end wall and axially extending snap-fit surfaces in which said legs are received on the other end wall.

28. The ball nut and screw assembly of claim 27 wherein said nut has groove portions for receiving said legs in interlocked assembly.

* * * * *

UNITED STATES PATENT AND TRADEMARK OFFICE
CERTIFICATE OF CORRECTION

PATENT NO. : 5,555,770
DATED : September 17, 1996
INVENTOR(S) : Randy W. Dolata and Lisa A. Houlihan It is certified that error appears in the above-indentified patent and that said Letters Patent is hereby corrected as shown below:

Column 3, line 22, change "29a" to -- 29b --; line 23, change "29" to -- 29a --.

Column 4, line 58, change "inward" to -- inwardly --.

Column 5, line 53, cancel "ends"; line 58, after "walls" insert -- axially outwardly --; line 59, change "wall" to -- walls --; line 60, cancel "axially outwardly".

Column 6, line 61, cancel "return assembly"; line 66, cancel "return assembly".

Column 7, line 21, cancel "return assembly"; line 30, insert -- said -- before "end"; line 34, cancel "return assembly".

UNITED STATES PATENT AND TRADEMARK OFFICE
CERTIFICATE OF CORRECTION

PATENT NO. : 5,555,770
DATED : September 17, 1996
INVENTOR(S) : Randy W. Dolata and Lisa A. Houlihan It is certified that error appears in the above-indentified patent and that said Letters Patent is hereby corrected as shown below:

Column 8, line 20, cancel "return assembly"; line 25, cancel "return assembly"; line 26, cancel "return assembly"; line 30, cancel "return assembly".

Signed and Sealed this

Seventh Day of January, 1997

*Attest:*

BRUCE LEHMAN

*Attesting Officer*  *Commissioner of Patents and Trademarks*